United States Patent [19]

Lee et al.

[11] Patent Number: 5,548,193
[45] Date of Patent: Aug. 20, 1996

[54] ARM POSITION CONTROL DEVICE FOR USE IN AN INDUSTRIAL ROBOT

[75] Inventors: Kee S. Lee; Won G. Kim; Yeong J. Park, all of Incheon, Rep. of Korea

[73] Assignee: Daewoo Heavy Industries Ltd., Incheon, Rep. of Korea

[21] Appl. No.: 355,775

[22] Filed: Dec. 14, 1994

[30] Foreign Application Priority Data

Dec. 30, 1993 [KR] Rep. of Korea ...................... 93-31564

[51] Int. Cl.$^6$ ...................................... G05B 19/40
[52] U.S. Cl. ..................... 318/568.11; 318/602; 318/468; 318/282
[58] Field of Search .................................. 318/466–469, 318/281, 282, 568.11, 568.16, 602; 901/11, 13, 49

[56] References Cited

U.S. PATENT DOCUMENTS

| | | | |
|---|---|---|---|
| 4,006,395 | 2/1977 | Reesen | 318/685 |
| 4,184,107 | 1/1980 | Turini et al. | 318/467 |
| 4,271,381 | 6/1981 | Munz et al. | 318/282 |
| 4,620,831 | 11/1986 | Poncet et al. | 901/49 X |
| 4,673,853 | 6/1987 | Tsunoda et al. | 318/443 |
| 4,823,063 | 4/1989 | Barba et al. | 318/689 |
| 5,271,292 | 12/1993 | Sawada et al. | 318/466 X |

FOREIGN PATENT DOCUMENTS 3-119405 5/1991 Japan.
4-167102 6/1992 Japan.

*Primary Examiner*—Brian Sircus
*Attorney, Agent, or Firm*—Lowe, Price, LeBlanc & Becker

[57] ABSTRACT

An arm position control device for use in an industrial robot which comprises: a support body; a rotary arm rotatably mounted on the support body for rotation towed one of clockwise and counterclockwise deviation zones from a home position within a permissible angular extent; a home position sensor fixedly attached to the support body to identify home position of the rotary arm; a limit sensor fixedly secured to the support body with a predetermined angular spacing from the home position sensor to detect movement of the rotary arm beyond the permissible angular extent; a sensor actuator rotatable with the rotary arm as a unit for keeping the home position sensor interrupted when the rotary arm lies in the clockwise deviation zone, for making the home position sensor released when the rotary arm lies in the counterclockwise deviation zone and for bringing the limit sensor into a released condition as the rotary arm is out of the permissible angular extent; and an arm actuator operatively coupled to the rotary arm for causing it to rotate counterclockwise when the home position sensor remains interrupted for causing the rotary arm to rotate clockwise when the home position sensor is kept released and for having the rotary arm move into the permissible angular extent when the limit sensor is in a disabled condition.

6 Claims, 4 Drawing Sheets

ARM POSITION CONTROL DEVICE FOR USE IN AN INDUSTRIAL ROBOT

FIELD OF THE INVENTION

The present invention pertains to an industrial robot of the type having a rotary arm swingable about a base or support arm within a permissible angular extent, and more particularly to an arm position control device for the industrial robot which is adapted to return the rotary arm from a remote angular position back to its home position at the occurrence of an extraordinary situation.

DESCRIPTION OF THE PRIOR ART

As is well-known to the ordinary artisan in the art, the rotary arm employed in the prior art industrial robot is able to move clockwise or counterclockwise from a home position, viz., reference position toward a desired target position. In the event that the industrial robot is suddenly deenergized during its movement or otherwise ceases its normal operation, the rotary arm tends to stop at a random position rather than to come back to the home position. To enable the industrial robot to restart at a later time, it is invariably required to first bring the rotary arm into the home position, prior to resuming the suspended job or carrying out a newly assigned task. Such home position returning of the rotary arm is also needed in case where it has inadvertently overrun beyond a permissible angular extent.

Japanese Patent Laid-open Publication No. 4-167102 published on Jun. 15, 1992 teaches a method of returning an industrial robot to its initial position wherein the current position of a rotary arm is continually stored at a register and, in case of emergency stop of the industrial robot, the rotary arm is caused to return back to its home position in accordance with the information stored at the register. This method appears to offer a distinct advantage over the prior art approach in that the home position returning operation is automatically done without resort to the operator's manual intervention. No teaching is however disclosed in the above Japanese patent publication as to how to detect the direction of rotation in which the rotary arm has moved from its home position and what steps should be taken if the rotary arm moves beyond a permissible operation range.

Japanese Patent Laid-open Publication No. 3-119405 published on May 21, 1991 discloses a home position returning device for use in a typical industrial robot, which comprises means for recognizing home position of a rotary arm, means for detecting deviation zone of the rotary arm from its home position to provide a detection signal and means responsive to the detection signal for having the rotary arm move toward the opposite deviation zone and then for stopping the rotary arm at the moment when it has fully returned back to the home position.

It is noted that the deviation zone detection means includes a disk carried by the arm for rotation therewith, the disk having a light reflection region and a light absorption region each extending along the perimeter of the disk in the opposite directions from their juncture, and a photoelectric sensor for projecting a light beam toward the reflection and absorption regions of the disk and then for receiving the light beam reflected back from the disk. The deviation zone on which the rotary arm lies can be identified by way of measuring the amount of the received light beam.

With the home position returning device referred to just above, the light reflection region on the disk is highly susceptible of contamination which in turn would lead to an inability for the photoelectric sensor to detect the deviation zone occupied by the rotary arm. Furthermore, the '405 publication remains silent on the technique of effectively detecting the arm's overrunning beyond a permissible angular extent.

SUMMARY OF THE INVENTION

Accordingly, it is an object of the present invention to provide an arm position control device for use in an industrial robot which can return a rotary arm back to its home position within a shortened period of time but with no likelihood of collision to the environmental structures or objects.

Another object of the invention is to provide an arm position control device capable of positively detecting undue movement of a rotary arm beyond a permissible angular extent by use of a singular limit sensor and further capable of bringing the overrun rotary arm into its home position in a safe and efficient manner.

With these objects in view, the novel invention resides in the provision of an arm position control device which comprises: a support body; a rotary arm rotatably mounted on the support body for rotation in one of clockwise and counterclockwise deviation zones within a permissible angular extent; a home position sensor fixedly attached to the support body to identify the home position of the rotary arm; a limit sensor fixedly secured to the support body with a predetermined angular spacing from the home position sensor to detect movement of the rotary arm beyond the permissible angular extent; a sensor activator rotatable with the rotary arm as a unit for keeping the home position sensor interrupted when the rotary arm lies in the clockwise deviation zone, for making the home position sensor released when the rotary arm lies in the counterclockwise deviation zone and for bringing the limit sensor into a released condition as the rotary arm moves out of the permissible angular extent; and an arm actuator operatively coupled to the rotary arm for causing the rotary arm to rotate counterclockwise when the home position sensor remains interrupted, for causing the rotary arm to rotate clockwise when the home position sensor is kept released and for having the rotary arm move into the permissible angular extent when the limit sensor is in a released condition.

BRIEF DESCRIPTION OF THE DRAWINGS

Other objects, features and advantages of the invention will become apparent from a review of the following detailed description of the preferred embodiment taken in conjunction with the drawings in which.

DETAILED DESCRIPTION OF THE PREFERRED EMBODIMENT

Figure 1:
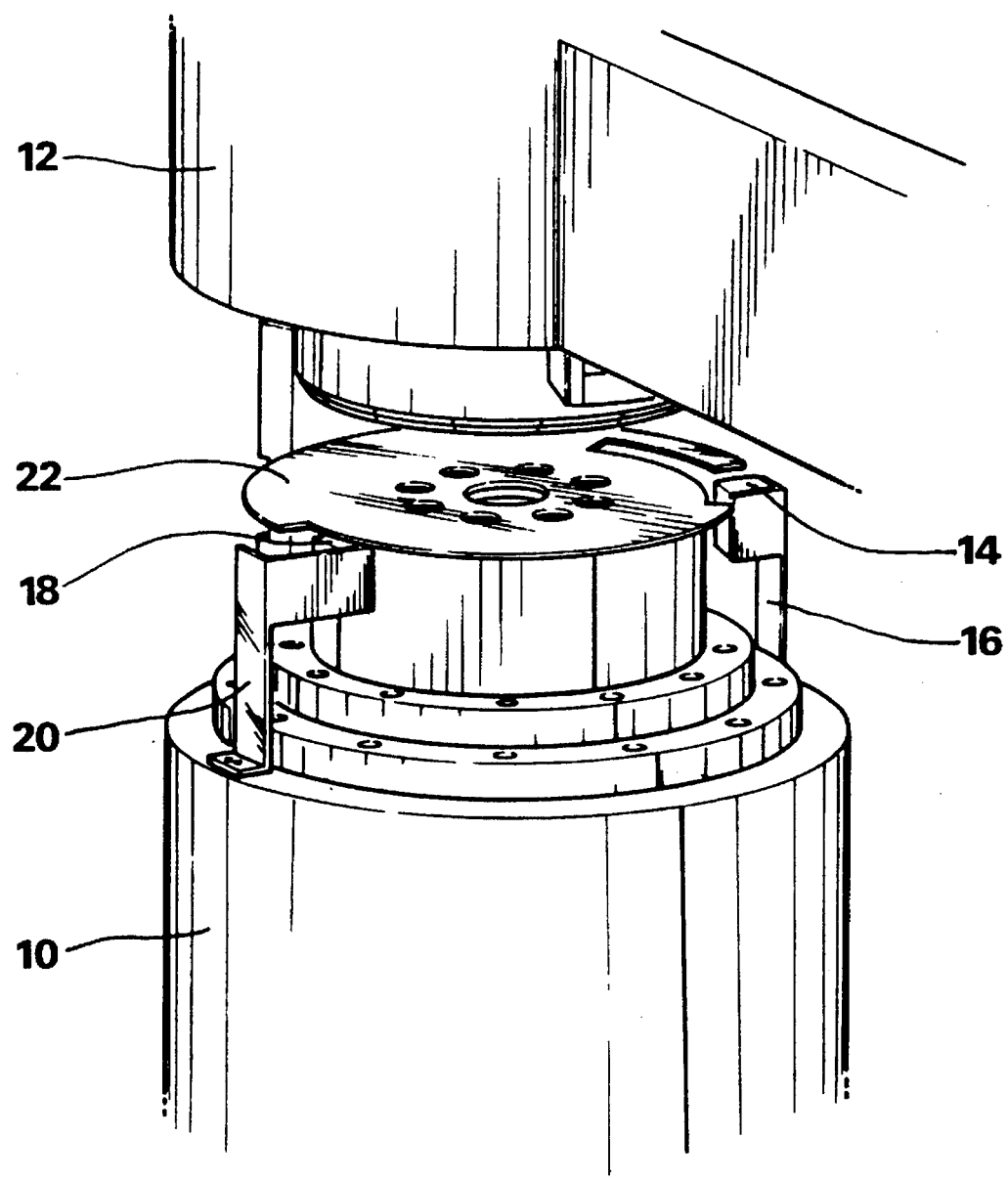
FIG. 1 is a partially cut away perspective view of an exemplary industrial robot that employs the arm position control device in accordance with the invention.

Referring to FIG. 1, there is shown a horizontal multiple articulation robot for industrial use which makes use of an arm position control device in accordance with the present invention. As shown, the robot includes, but is not limited to, a generally cylindrical base or support body 10 and a rotary arm 12 coaxially mounted on the top of the support body 10 for rotational movement with respect to the support body 10. As a rule, the rotary arm 12 is adapted to rotate clockwise or counterclockwise within a limited permissible angular extent, e.g., less than 150 degrees in total, so as to perform a specific task assigned to the robot. Such an angular movement of the rotary arm 12 may be caused by an electric motor or other suitable prime mover. The permissible angular extent can be divided into a clockwise deviation zone extending clockwise, e.g., 75 degrees from a home position of the rotary arm 12 and a counterclockwise deviation zone extending counterclockwise the same angular extent as that of the clockwise deviation zone.

It can be seen in FIG. 1 that a home position sensor 14 is fixedly secured to the top peripheral edge of the support body 10 by means of a bracket 16. The home position sensor 14 has the ability not only to detect a home position of the rotary arm 12 but also to determine in which direction the rotary arm has turned from the home position, i.e., whether the rotary arm 12 is currently on the clockwise deviation zone or on the counterclockwise deviation zone. A single limit sensor 18 is attached, by means of a bracket 20, to the diametrically opposite edge of the support body 10 from the home position sensor 14. The limit sensor 18 serves to detect undue rotational movement of the rotary arm 12 beyond the permissible angular extent.

In the illustrated embodiment, the home position sensor 14 and the limit sensor 18 are both a known proximity sensor that can determine presence or absence of an object based on the fluctuation of its capacitance. It should be noted that other suitable sensors, e.g., a typical photoelectric sensor may equally be used for the purpose of dectecting the angular position of the rotary arm 12.

Figure 2:
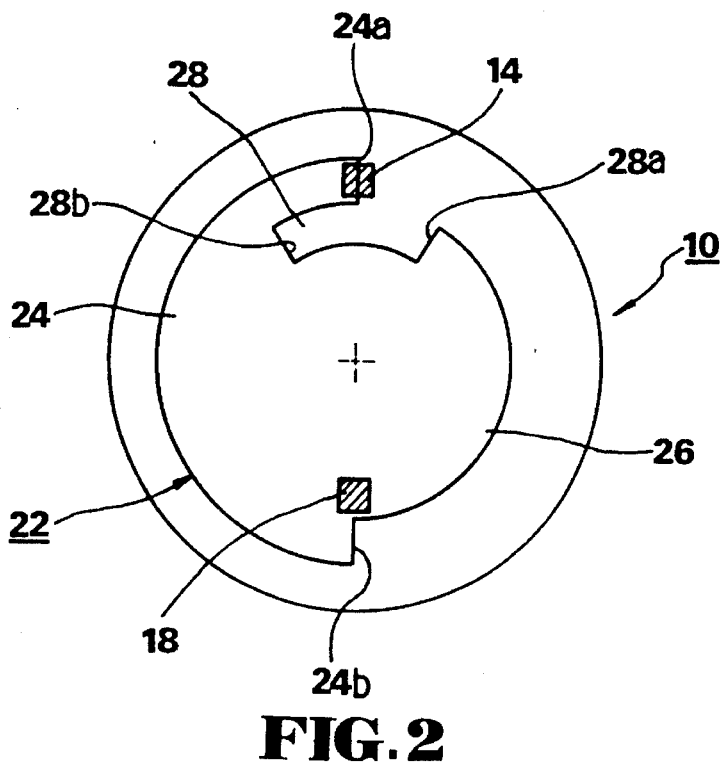
FIG. 2 schematically shows positional relationship between a disk-like plate carried by the rotary arm and a pair of proximity sensors mutually diametrically arranged on the support body.

As best shown in FIGS. 1 and 2, the limit sensor 18 is positioned nearer to the axis of the rotary arm 12 than the home position sensor 14 may be. In other words, the home position sensor 14 should preferably be placed on a first imaginary circle whose center is coinciding with the axis of the rotary arm 12, whereas the limit sensor 18 should assume a position somewhere on a second concentric imaginary circle whose diameter is smaller than that of the first imaginary circle. As will be described later in more detail, the home position sensor 14 remains interrupted in case where the rotary arm 12 has rotated clockwise from the home position, but counterclockwise rotation of the rotary arm 12 from the home position makes the home position sensor 14 released. Moreover, the limit sensor 18 is normally kept interrupted and may become released only if the rotary arm 12 would be subjected to undue movement beyond the permissible angular extent. As used herein, the term "interrupted" is intended to mean that the sensors 14, 18 are rendered active to generate one kind of electric signal. Similarly, by the term "released" is meant that the sensors 14, 18 become passive to issue the other kind of electric signal.

Attached to the underside of the rotary arm 12 by screws or other suitable fasteners is a disk-like contoured plate 22 or sensor activator that can make the sensors 14, 18 operable in a predetermined fashion, depending upon the angular position of the rotary arm 12. As can be clearly seen in FIG. 2, the disk-like plate 22 is concentric with the axis of the rotary arm 12 and has a unique contour which allows the plate 22 to properly activate the sensors 14, 18 in a controlled manner. Specifically, the disk-like contoured plate 22 includes a generally semicircular, large diameter sector 24 extending an angular extent of about 180 degrees from a first end 24a through a second end 24b, a small diameter sector 26 extending an angular extent of less than 180 degrees at the opposite side of the large diameter sector 24 and an arcuate cutout 28 which extends a given angular extent, e.g., 60 degrees, over the large and small diameter sectors 24, 26, the cutout 28 beginning with a first end 28a and ending with a second end 28b.

Figure 3A:
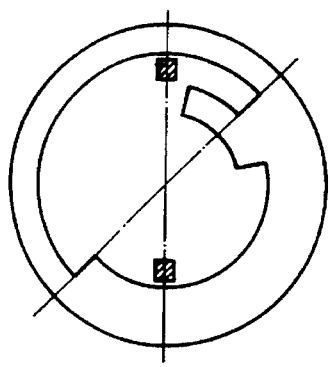
FIGS. 3A and 3B illustrate, respectively, a couple of angular positions in which the disk-like plate lies when the rotary arm has been rotated clockwise and counterclockwise within a permissible angular extent.
Figure 3B:
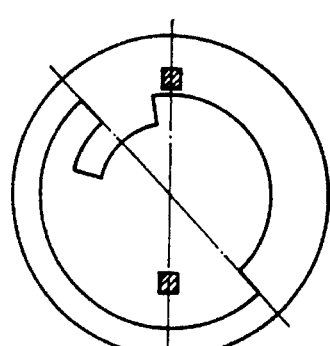
Figure 4A:
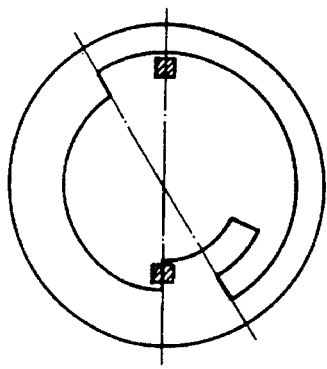
FIGS. 4A and 4B illustrate another two angular positions in which the disk-like plate lies when the rotary arm has overrun clockwise and counterclockwise, respectively.

The large diameter sector 24 has a radius of curvature enough to cover or hide the home position sensor 14. This ensures that clockwise rotation of the disk-like contoured plate 22 as depicted in FIG. 3A should keep the home position sensor 14 interrupted. On the other hand, the small diameter sector 26 has such a radius of curvature as to uncover or expose the home position sensor 14, while hiding the limit sensor 18 thereunder. Thus the small diameter sector 26 will make the home position sensor 14 released as the disk-like plate 22 moves counterclockwise from the home position as shown in FIG. 3B. The arcuate cutout 28 is so configured and sized that the limit sensor 18 may be exposed therethrough in case of the rotary arm 12 overrunning out of the permissible angular extent. Accordingly, clockwise overrunning of the rotary arm 12 as illustrated in FIG. 4A will bring the limit sensor 18 into a released condition. Such is also the case where the rotary arm 12 and hence the disk-like plate 22 are caused to overrun in the counterclockwise direction as exemplified in FIG. 4B.

Figure 5:
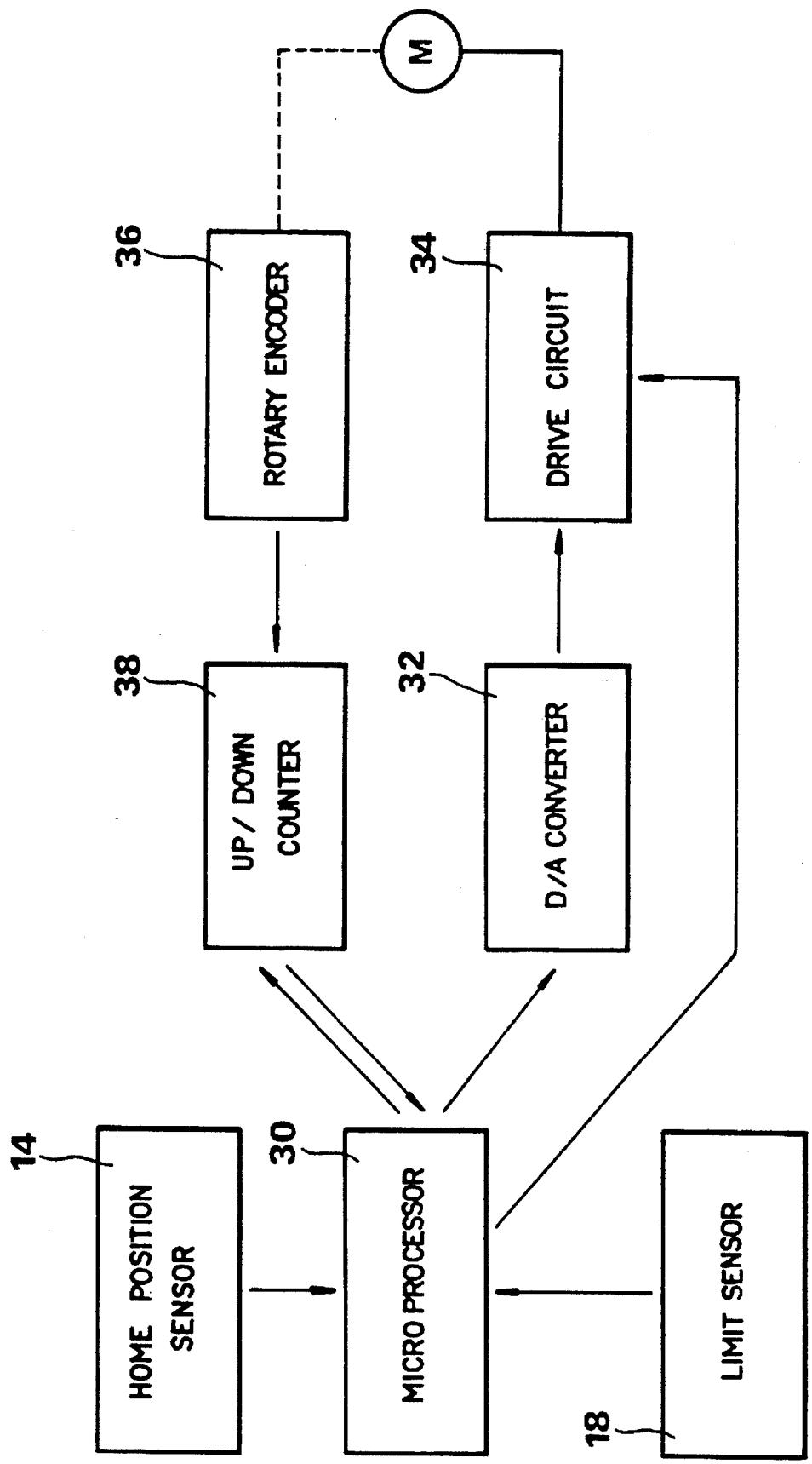
FIG. 5 is a block diagram showing the electronic control unit adapted to properly control an electric motor in response to the signals fed from the proximity sensors.

FIG. 5 shows a block diagram of a motor control unit designed to control the direction and the angle of rotation of the electric motor which is drivingly coupled to the rotary arm 12. The motor control unit is provided with, inter alia, a microprocessor 30 that can process electric signals received from the home position sensor 14 and the limit sensor 18. For the motor to be energized, the microprocessor 30 should supply command pulses to a digital-to-analogue converter 32 in a programmed manner, the frequency of the command pulses exactly corresponding to an angular displacement amount of the rotary arm 12. The digital-to-analogue converter 32 will then supply to a drive circuit 34 such a voltage signal whose frequency is identical to that of the command pulses. The drive circuit 34 serves to rotatably drive the electric motor M in response to the voltage signal supplied from the digital-to-analogue converter 32 and the direction-of-rotation command signal directly fed from the microprocessor 30. The position of the rotating motor continues to be detected by a rotary encoder 36 which, in turn, issues pulse signals to an up/down counter 38. It should be appreciated that the rotary encoder 36 has an additional function to generate a zero phase or reference position pulse signal each time when it is subjected to one full rotation. By way of providing count value, the up/down counter 38 enables the microprocessor 30 to detect the amount of forward or reverse rotation of the motor and the current position of the rotary arm 12.

Figure 6:
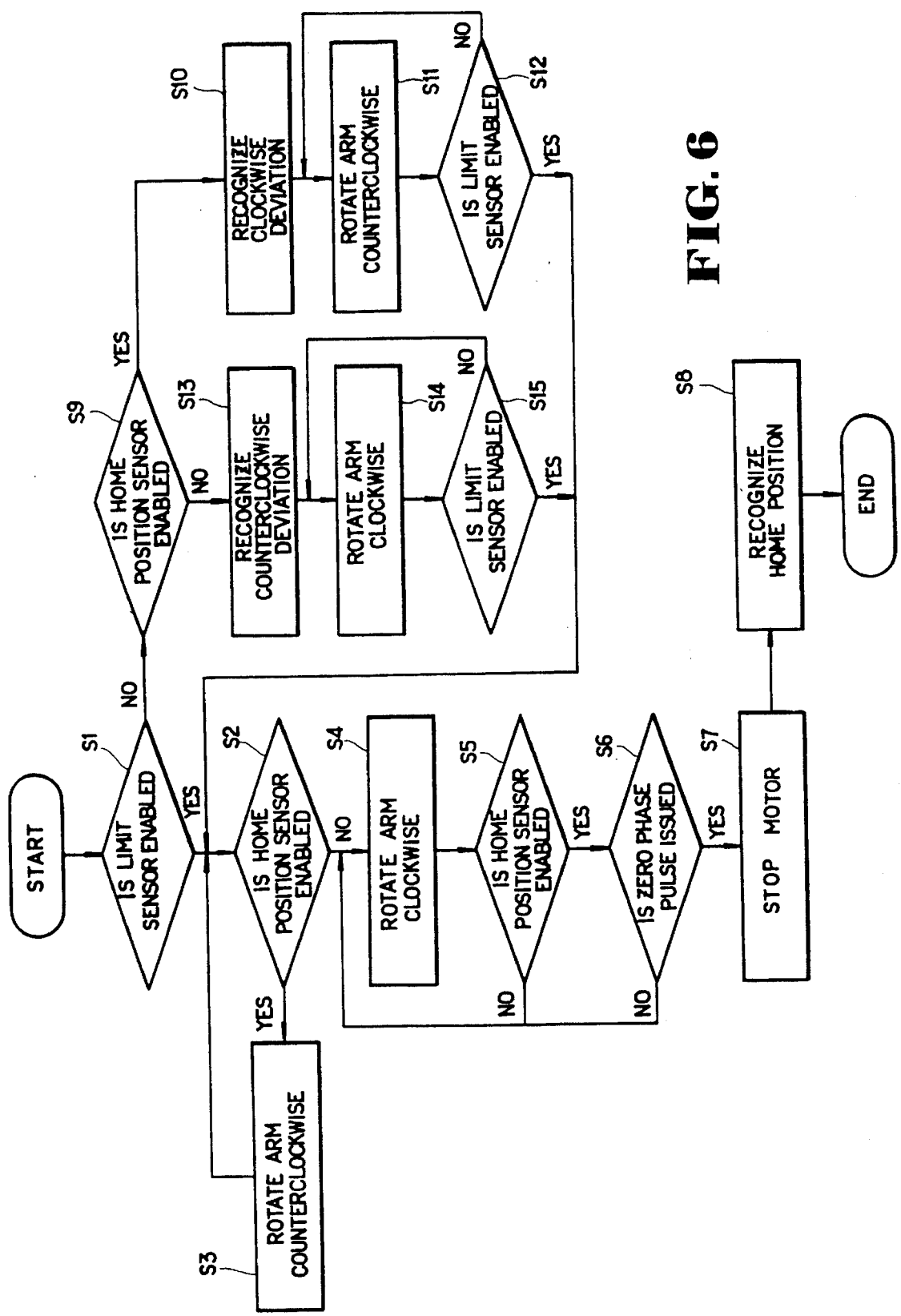
FIG. 6 is a flow chart illustrating the home position returning steps performed by the arm position control device in accordance with the invention.

Operation of the inventive arm position control device will now be set forth in detail with reference mainly to the flow chart of FIG. 6 that illustrates an exemplary home position returning process of the rotary arm.

1. In Case Where the Rotary Arm Lies in a Position of FIG. 3A

If there occurs a need to return the rotary arm 12 back to the home position, the microprocessor 30 will determine at the first instance whether the limit sensor 18 remains interrupted or not, thus checking up the presence or absence of the rotary arm 12 within a permissible angular extent (S1).

Given that the limit sensor 18 is kept interrupted and, therefore, produces a normal condition signal indicative of the rotary arm being within the permissible angular extent, then the microprocessor 30 shall make a determination as to whether the home position sensor 14 is interrupted (S2). Assuming that the rotary arm 12 and, hence, the disk-like plate 22 lie somewhere in a clockwise deviation zone as shown in FIG. 3A, the home position sensor 14 should be kept interrupted to produce a first detection signal, in response to which the microprocessor 30 will supply a counterclockwise rotation command signal to the drive circuit 34 and a pulse signal of given frequency to the digital-to-analogue converter 32. This will enable the electric motor M to turn in the reverse direction, thereby causing the rotary arm 12 to rotate counterclockwise (S3).

As the rotary arm 12 continues to rotate counterclockwise, the disk-like plate 22 will bring the home position sensor 14 into a released condition so that the home position sensor 14 can produce a second detection signal. Responsive to the second detection signal, the microprocessor 30 will have the rotary arm 12 turn clockwise until the home position sensor 14 would get interrupted again (S4). If it is confirmed that the home position sensor 14 has become interrupted (S5), a further determination is made as to whether the rotary encoder 36 generates a zero phase pulse signal (S6). As soon as the zero phase pulse signal is produced by the rotary encoder 26, the microprocessor 30 will get the electric motor stopped (S7) and recognizes that the rotary arm 12 has returned back to its home position (S8).

2. In Case Where the Rotary Arm Lies in a Position of FIG. 3B

Assuming that the rotary arm 12 is in a counterclockwise deviation zone as exemplified in FIG. 3B, it is determined by the microprocessor 30 that the home position sensor 14 remains released to thereby produce a second detection signal (S2). Responsive to the second detection signal, the microprocessor 30 will cause the rotary arm 12 to turn clockwise until the home position sensor 14 would get interrupted again (S4). If it is confirmed that the home position sensor 14 has become interrupted (S5), a further determination is made as to whether the rotary encoder 36 generates a zero phase pulse signal (S6). As soon as the zero phase pulse signal is produced by the rotary encoder 36, the microprocessor 30 stops the electric motor (S7) and recognizes that the rotary arm 12 has returned back to its home position (S8).

3. In Case Where the Rotary Arm Lies in a Position of FIG. 4A

If the disk-like plate 22 carried by the rotary arm 12 is in such a position as illustrated in FIG. 4A, the limit sensor 18 will be exposed through the first end 28a of the arcuate cutout 28 and become released, thus generating an emergency signal indicative of the rotary arm 12 being out of the permissible angular extent. The emergency signal makes it possible for the microprocessor 30 to know that the limit sensor 18 in a released condition (S1).

Once the limit sensor 18 is found disabled in this way, the microprocessor 30 will execute a further determination as to whether the home position sensor 14 remains interrupted or not (S9). Since the home position sensor 14 remains interrupted in FIG. 4A, the microprocessor 30 recognizes a clockwise overrunning of the rotary arm 12 (S10) and causes the rotary arm 12 to rotate counterclockwise (S11). Whether the limit sensor 18 has become interrupted or not is then judged by the microprocessor 30 (S12). If the answer is affirmative, steps S2 through S8 should be executed in the same manner as explained above to thereby return the rotary arm 12 back to the home position.

4. In Case Where the Rotary Arm Lies in a Position of FIG. 4B

Figure 4B:
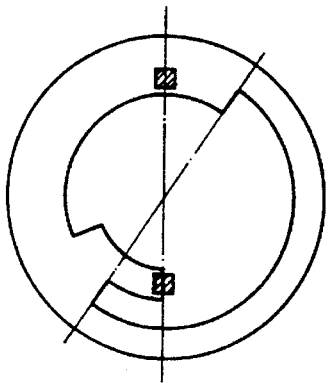

When the disk-like plate 22 carried by the rotary arm 12 is in such a position as shown in FIG. 4B, the limit sensor 18 will be exposed through the second end 28b of the arcuate cutout 28 and become released to produce an emergency signal representative of the rotary arm 12 being out of the permissible angular extent. The emergency signal makes it possible for the microprocessor 30 to know that the limit sensor 18 is in a released condition (S1).

If the limit sensor 18 is found released in this way, the microprocessor 30 will execute a further determination as to whether the home position sensor 14 remains interrupted or not (S9). Inasmuch as the home position sensor 14 is kept released in FIG. 4B, the microprocessor 30 recognizes a counterclockwise overrunning of the rotary arm 12 (S13) and causes the rotary arm 12 to rotate clockwise (S14). Whether the limit sensor 18 has become interrupted or not is then judged by the microprocessor 30 (S15). If the answer is affirmative, steps S2 through S8 should be executed in the same manner as stated above to thereby bring the rotary arm 12 into the home position.

While the invention has been described with reference to a preferred embodiment, it should be apparent to those skilled in the art that many changes and modifications may be made without departing from the spirit and scope of the invention as defined in the claims.

What is claimed is:

1. An arm position control device for use in an industrial robot including a cylindrical support body with a longitudinal axis and a rotary arm mounted on the support body for rotation within a permissible angular extent, the rotary arm having a rotational axis in alignment with the longitudinal axis of the support body, which comprises:

a home position sensor fixedly secured to the support body at a position of first radius from the longitudinal axis to detect a home position and direction of deviation from the home position of the rotary arm;

a limit sensor affixed to the support body at a position of second radius from the longitudinal axis in a diametrically opposing relationship with the home position sensor to detect undue rotation of the rotary arm beyond the permissible angular extent;

a sensor activator disk coaxially attached to the rotary arm for selectively interrupting and releasing the home position sensor and the limit sensor, the sensor activator disk having first and second radial flanks oppositely located along a diameter of the disk, a first sector extending from the first radial flank up to the second radial flank with a diameter enough to interrupt the home position sensor, a second sector provided at an opposite side of the first sector with a smaller diameter than the first sector to release the home position sensor, and an arcuate cutout provided radially inwardly of the first radial flank in an overlapping relationship with the first and second sectors to release the limit sensor as the rotary arm is caused to turn beyond the permissible angular extend; and an arm actuator means operatively associated with the home position sensor and the limit sensor for causing the rotary arm to stop as the limit sensor is released and turn toward the home position in a first direction if the home position sensor remains interrupted with the limit sensor released and to turn toward the home position in a second direction if the home position sensor and the limit sensor are released.

2. The arm position control device as recited in claim 1, wherein the first radius is greater than the second radius.

3. The arm position control device as recited in claim 2, wherein the arcuate cutout is radially outwardly opened at the side of the second sector of the sensor activator disk.

4. The arm position control device as recited in claim 1, further comprising a rotary encoder operatively connected to the arm actuator means for generating a zero pulse signal as the rotary arm reaches the home position.

5. The arm position control device as recited in claim 4, wherein the home position sensor comprises a proximity sensor adapted to generate a first detection signal when interrupted and a second detection signal when released and wherein the limit sensor comprises a proximity sensor adapted to produce an emergency signal when released and a normal condition signal when interrupted.

6. The arm position control device as recited in claim 5, wherein the arm actuator means includes an electric motor drivingly coupled to the rotary arm and means responsive to the zero pulse signal, the first detection signal, the second detection signal and the emergency signal for controlling movement of the motor to cause the rotary arm to turn back to the home position.

* * * * *